Patented Feb. 6, 1934

1,946,447

UNITED STATES PATENT OFFICE 1,946,447

PROPIONIC ACID FERMENTATION OF FRUCTOSE-CONTAINING MASHES

Hugh R. Stiles, Terre Haute, Ind.

No Drawing. Application June 29, 1932
Serial No. 619,964

13 Claims. (Cl. 260—120)

The present invention relates to a process for the production of propionic acid by the fermentation of carbohydrate mashes. More specifically, the present invention relates to the production of propionic acid by the combined action of mannitol-forming bacteria and propionic acid bacteria upon fructose-containing mashes.

The propionic acid fermentation, as previously carried out, has been unsatisfactory from a commercial standpoint in a number of respects. The yields obtained have been relatively low and the fermentation has, in most cases, been too slow for practical purposes. United States Patent No. 1,459,959 of Sherman et al., discloses a method for accelerating this fermentation by means of lactic acid organisms and certain other bacteria. However, even with this improvement, the fermentation has been undesirably slow and the yields have not been greatly improved.

It has been known for some time that the propionic acid bacteria are capable of fermenting mannitol with some degree of success. However, no results upon commercial concentrations have been reported and nothing has been known regarding the rate of fermentation or the ratio of products obtained. It has been assumed, however, that, as in the case of other mannitol fermentations, the fermentation would be much too slow or the yield would be greatly reduced (see for example the butyl-acetonic fermentation of mannitol reported by Johnson et al., Journal of Biological Chemistry 91, 569, 1931).

However, the surprising discovery has now been made that if a fructose-containing mash is subjected to the combined action of mannitol-forming bacteria and propionic acid bacteria, improved yields are obtained, a more rapid fermentation is secured, and a higher ratio of propionic acid to acetic acid in the products is obtained. While it is assumed that these improved results arise from a true symbiotic action of the two types of bacteria, it is to be distinctly understood that this invention is not to be limited to any particular theory of operation. The formation of mannitol by the first group of organisms and the subsequent fermentation of this material by the propionic acid bacteria may be wholly responsible for the improved results. On the other hand, the results may arise from the effect of certain metabolic by-products of the mannitol-forming organisms or from other unknown favorable changes in the medium brought about by the action of these organisms. In any event, the fact remains that by the combined action of these two groups of organisms, greatly improved results are secured.

Briefly, the process comprises subjecting a fructose-containing mash to the combined action of mannitol-forming bacteria and propionic acid bacteria. It is preferred, in most cases, to subject the mash first to the action of mannitol-forming bacteria and then to subject the resulting at least partially fermented mash to the action of the propionic acid bacteria. However, since it is well known to those skilled in the art that the mannitol-forming organisms grow much more rapidly than the propionic acid bacteria, it is apparent that the mash may be inoculated simultaneously with both organisms or may even be inoculated first with the propionic acid bacteria. In either of the latter cases the mannitol-forming organisms will grow sufficiently rapidly so that at the end of the fermentation the propionic acid bacteria will in effect be operating upon a mash at least partially fermented by the mannitol organisms.

It is therefore seen that this invention may be carried out in a number of different ways. For example, the fermentation by means of the mannitol-forming organisms may be allowed to go to completion before the mash is inoculated with the propionic acid bacteria; the mesh may be simultaneously inoculated with both types of organisms; or as pointed out above, the mannitol-forming organisms may be added to a mash previously inoculated with propionic acid bacteria. Likewise, the fermentation may be carried out either by the batch process or by a continuous process. With any of the methods of inoculation outlined above, after both types of organisms have been introduced into the mash, the fermentation may be carried out continuously by successively drawing off a portion of the fermented mash and adding an equal portion of unfermented mash. This may, of course, be accomplished in either a true continuous or semi-continuous manner, depending upon the type of apparatus used.

As the propionic acid bacteria for this process there may be employed any of the known types, for example those described in The Propionic Acid Bacteria, C. B. Van Niel, N. V. Uitgeverszaak J. W. Boissevain & Co. Haarlem, 1928. Especially suited for this process is *Bacterium acidipropionici,* an organism isolated from Swiss cheese; and various strains of this organism may be employed, as, for example, *Bacterium acidi propionici,* *Bacterium acidi propionici* strain "a", strain "b", strain "c", strain "d", or strain "rubrum". Particularly suited to the present process are cultures containing *Bacterium acidi propionici, Bacterium acidi propionici* strain "b", strain "c", or strain "rubrum".

As the manitol-forming bacteria for the present process any of the known types may be employed, such as for example, *Bacterium mannitopoeum, Bacillus gayoni,* and *Lactobacillus fermentum,* or any of the organisms described in Fermentation products of certain mannitol-forming bacteria, H. R. Stiles et al., Journal of Biological Chemistry 64, 643, 1925.

In addition to the mannitol-forming bacteria, there may be employed known accelerating organisms such as those disclosed in United States Patent No. 1,459,959 of Sherman et al. For example there may be used:

1. Those organisms which produce lactic acid from carbohydrates, as for example, those described on pages 241–255 of Bergey's Manual of Determinative Bacteriology (1923 edition);

2. Organisms which hydrolyze nitrogenous substances and form therefrom new materials which can be acted upon by other bacteria, such as the members of the Proteus group (pages 209–211 of Bergey's Manual of Determinative Bacteriology);

3. Organisms which do not fall into either of the preceding groups but which ferment salts of organic acids such as the members of the Alcaligines group (pages 233–237 of Bergey's Manual of Determinative Bacteriology).

The use of lactic acid bacteria such as *Lactobacillus casei* in conjunction with the propionic acid bacteria is particularly adapted to the present process, especially if carbohydrates other than fructose-yielding organisms are included in the mash. As is known to those skilled in the art, if carbohydrates other than fructose-yielding carbohydrates are fermented by the mannitol-forming bacteria, increased amounts of acetic acid or lactic acid and ethyl alcohol are produced in place of mannitol. Since acetic acid and ethyl alcohol are not fermentable to propionic acid as is mannitol, it is apparent that a loss in the desired product would result. However, if lactic acid bacteria are present they will ferment at least a considerable portion of the non-fructose-yielding carbohydrates and the resulting lactates will be fermented to propionic acid.

In this way it is seen that a three-sided symbiotic action is secured. For example, if a glucose-fructose mixture is utilized, the mannitol-forming organisms will ferment most of the fructose to mannitol, the lactic acid organisms will ferment most of the glucose to lactates, and the propionic acid organisms will ferment the remaining glucose and fructose, together with the resulting mannitol and lactates, to propionic acid. Here again the improved results are probably not entirely due to the formation of mannitol and lactic acid but are probably also due to the metabolic by-products of these organisms and other unknown beneficial changes in the medium which are brought about by the presence of these bacteria. In any event, the present invention is not to be taken as limited to a particular theory of operation.

As in the case of the use of only the propionic acid organisms and the mannitol-forming organisms, a number of different modes of procedure may be employed when all three types of bacteria are utilized. For example, the mash may be simultaneously inoculated with all three organisms, or the fermentation by means of the mannitol-forming organisms and the lactic acid organisms may be allowed to go to completion before inoculation with the propionic acid bacteria. A further modification would be to inoculate the mash with the propionic acid bacteria and subsequently to inoculate with the mannitol-forming organisms and the lactic acid bacteria. Although this latter process would be operative if the subsequent inoculation were carried out a substantial time before the completion of the propionic fermentation, it is apparent that no particular advantage would be gained by this procedure. As in the case of the simpler combination of only the mannitol-forming organisms and the propionic acid bacteria, a continuous or semi-continuous fermentation process may also be utilized when all three types of bacteria are employed. Any one of the above methods of inoculation will lend itself to continuous or semi-continuous operation according to the known methods, after all three types of organisms have been introduced into the mash.

As the fermentable sugar for this fermentation any soluble fructose-yielding carbohydrate may be employed and there may also be used in conjunction with the fructose-yielding carbohydrate any other carbohydrate fermentable by the propionic acid bacteria employed. As examples of fructose-yielding carbohydrate solutions there may be mentioned solutions of sucrose, raffinose, gentianose, etc., inversion products of these sugars such as the commonly known "invert sugar" from sucrose, molasses, inverted molasses, hydrolyzed inulin, hydrolyzed Jerusalem artichoke tubers, and the like. In conjunction with fructose or these fructose-yielding carbohydrates there may be employed any carbohydrate fermentable by the propionic acid bacteria as for example glucose, maltose, lactose, "hydrol" (the molasses obtained in the corn sugar industry), hydrolyzed grain, and the like.

As was noted above, if considerable quantities of non-fructose-yielding carbohydrates are present, especially if lactic acid bacteria are not employed, undesirable products will be obtained. It is therefore advisable to insure the presence of a certain known percentage of fructose or its equivalent in any mash to be subjected to the action of mixed cultures including mannitol-forming organisms. It has been found that in most cases a "fructose equivalent" of at least 25% of the total soluble carbohydrate present is desirable. By fructose equivalent is meant the percentage of a fructose-yielding carbohydrate which is known to yield approximately the same amount of mannitol as a unit percentage of fructose (see for example Fermentation products of certain mannitol-forming bacteria, H. R. Stiles et al., Journal of Biological Chemistry 64, 643, 1925). Thus, sucrose is known to have a fructose equivalent of about one-eighth. It is therefore evident that instead of a solution the carbohydrate content of which comprises 25% fructose and 75% glucose, there might be employed a solution containing 20% fructose, 40% glucose and 40% sucrose. Since the average molasses contains approximately 20% fructose, 20% glucose and 60% sucrose, it is apparent that this is somewhat richer in fructose equivalent than the 25% limit specified. Thus molasses has been found to be suitable for the present process. It is apparent, however, that if the molasses is inverted by hydrolysis with dilute acid, the fructose content will be increased to approximately 50% with resulting increased beneficial results in the fermentation.

Aside from the necessity for the presence of fructose-yielding carbohydrates, the mashes employed may be of any type known to be suitable for the propionic acid fermentation. Thus, known nutrients such as soluble nitrogen in the form of yeast water, steep water, butyl-acetonic slop or distillery wastes from other fermentation industries may be employed. The hydrogen ion concentration may be maintained within the same limits as suitable for the fermentation by propionic acid bacteria alone, e. g., a pH of 5.4–6.0, the pH maintained by an excess of calcium carbonate in the medium. The fermentation temperature may likewise be maintained within the limits known to be operative for the propionic fermentation. The preferred temperature, however, is 30–31° C. In all other respects, such as the mechanical steps in carrying out the fermentation, the known methods for the propionic acid fermentation may be employed.

The invention may perhaps be best illustrated by the following specific examples:

Example I

A mash containing 5% of invert sugar, 0.6% of steep water (dry basis) and 3% of calcite, is inoculated with approximately 5% of a culture containing 95% propionic acid bacteria and 5% mannitol-forming bacteria, and the fermentation is allowed to proceed at 30° C. in the usual manner for the propionic acid fermentation.

Example II

A mash containing 10% of molasses (i. e. 5% total sugar), 0.6% of steep water (dry basis) and 3% of calcite, is inoculated with about 2% by volume of a culture containing approximately 90% propionic acid bacteria, 5% mannitol-forming bacteria, and 5% lactic acid bacteria. The fermentation is allowed to proceed at 30° C. in the usual manner for the propionic acid fermentation.

Example III

A mash of inverted molasses diluted with butyl-acetonic slop to a concentration of about 10% (i. e. approximately 5% of invert sugar), containing 3% of calcite, is inoculated with 2% of a culture containing approximately 50% of mannitol-forming bacteria and approximately 50% of lactic acid bacteria. The fermentation is allowed to go to completion and the resulting mash is then inoculated with propionic acid bacteria. The fermentation is then allowed to continue in the usual manner for the propionic acid fermentation.

Example IV

A mash containing 5% of hydrolyzed inulin (i. e. approximately 5% of fructose), 0.6% distillery waste from the alcoholic fermentation (dry basis), and 3% of calcite is inoculated with about 2% by volume of a culture of propionic acid bacteria. After fermentation has proceeded sufficiently to build up a large concentration of these bacteria in the mash, a 2% inoculum of a mixture of mannitol-forming bacteria and lactic acid bacteria is introduced. The fermentation is then allowed to proceed to completion in the usual manner for the propionic acid fermentation.

Example V

A mash containing approximately 10% of inverted molasses, 0.6% of steep water (dry basis) and 3% of calcite is inoculated with a mixed culture containing approximately 90% of propionic acid bacteria in the form of a culture containing *Bacterium acidi propionici*, *Bacterium acidi propionici* strain "b", strain "c", or strain "rubrum", approximately 5% of *Lactobacillus casei* and approximately 5% of *Lactobacillus fermentum*. The fermentation is allowed to proceed at 30° C. for seven days at which time the fermented mash is allowed to settle, 50% of the mash is withdrawn, preferably from the top of the vessel, and an equal portion of fresh mash is introduced. In this manner a semi-continuous fermentation may be carried out indefinitely so long as contamination or other difficulties are not encountered.

It is to be pointed out that in all the above examples, and particularly in the last example where semi-continuous operation is utilized, particular precautions should be taken to prevent contamination by butyric acid bacteria.

It is to be distinctly understood that the above examples are merely illustrative of the present invention and that the invention is not to be taken as limited to the particular processes described. Neither is the invention to be limited to the particular strains of bacteria or the particular types of raw materials specified. Equivalents which would naturally occur to one skilled in the art may be employed without departing from the spirit of the invention.

The invention now having been described, what is claimed is:

1. A process for the production of propionic acid by fermentation which comprises subjecting to the action of a bacterial culture containing mannitol-forming bacteria a fermentable mash containing soluble carbohydrate material of at least 25% fructose equivalent, and subjecting the resulting, at least partially fermented, mash to the action of propionic acid bacteria.

2. A process for the production of propionic acid by fermentation which comprises subjecting to the action of mannitol-forming bacteria and lactic acid bacteria a fermentable mash containing soluble carbohydrate material of at least 25% fructose equivalent, and subjecting the resulting, at least partially fermented, mash to the action of propionic acid bacteria.

3. A process for the production of propionic acid by fermentation which comprises subjecting to the action of mannitol-forming bacteria and lactic acid bacteria a fermentable mash containing soluble carbohydrate material of at least 25% fructose equivalent, and subjecting the resulting, at least partially fermented, mash to the action of a culture of propionic acid bacteria including a strain of the group consisting of *Bacterium acidi propionici*, *Bacterium acidi propionici* strain "b", strain "c", and strain "rubrum".

4. A process for the production of propionic acid by fermentation which comprises subjecting to the action of a bacterial culture containing mannitol-forming bacteria a fermentable mash containing molasses as the soluble carbohydrate material, and subjecting the resulting, at least partially fermented, mash to the action of propionic acid bacteria.

5. A process for the production of propionic acid by fermentation which comprises subjecting to the action of mannitol-forming bacteria and lactic acid bacteria a fermentable mash containing molasses as the soluble carbohydrate material, and subjecting the resulting, at least partially fermented, mash to the action of propionic acid bacteria.

6. A process for the production of propionic acid by fermentation which comprises subjecting to the action of mannitol-forming bacteria and lactic acid bacteria a fermentable mash containing molasses as the soluble carbohydrate material, and subjecting the resulting, at least partially fermented, mash to the action of a culture of propionic acid bacteria including a strain of the group consisting of Bacterium acidi propionici, Bacterium acidi propionici strain "b", strain "c", and strain "rubrum".

7. A process for the production of propionic acid by fermentation which comprises subjecting to the action of a bacterial culture containing mannitol-forming bacteria a fermentable mash containing inverted molasses as the soluble carbohydrate material, and subjecting the resulting, at least partially fermented, mash to the action of propionic acid bacteria.

8. A process for the production of propionic acid by fermentation which comprises subjecting to the action of mannitol-forming bacteria and lactic acid bacteria a fermentable mash containing inverted molasses as the soluble carbohydrate material, and subjecting the resulting, at least partially fermented, mash to the action of propionic acid bacteria.

9. A process for the production of propionic acid by fermentation which comprises subjecting to the action of mannitol-forming bacteria and lactic acid bacteria a fermentable mash containing inverted molasses as the soluble carbohydrate material, and subjecting the resulting, at least partially fermented, mash to the action of a culture of propionic acid bacteria including a strain of the group consisting of Bacterium acidi propionici, Bacterium acidi propionici strain "b", strain "c", and strain "rubrum".

10. A process for the production of propionic acid by fermentation which comprises subjecting a fermentable mash containing soluble carbohydrate material of at least 25% fructose equivalent to the combined action of mannitol-forming bacteria and propionic acid bacteria.

11. A process for the production of propionic acid by fermentation which comprises subjecting a fermentable mash containing soluble carbohydrate material of at least 25% fructose equivalent to the combined action of mannitol-forming bacteria and propionic acid bacteria of the group consisting of Bacterium acidi propionici, Bacterium acidi propionici strain "b", strain "c", and strain "rubrum".

12. A process for the production of propionic acid which comprises subjecting a molasses-containing mash to the combined action of mannitol-forming bacteria and propionic acid bacteria.

13. A process for the production of propionic acid which comprises subjecting a molasses-containing mash to the combined action of mannitol-forming bacteria and propionic acid bacteria of the group consisting of Bacterium acidi propionici, Bacterium acidi propionici strain "b", strain "c", and strain "rubrum".

HUGH R. STILES.